United States Patent Office 2,900,233
Patented Aug. 18, 1959

2,900,233

PROCESS FOR THE PRODUCTION OF CALCIUM CYANAMIDE

Gustave Soetaert, Oostacker, Belgium, assignor to Societe Belge d'Electrochimie, Société Anonyme, Langerbrugge, Belgium, a Belgian company No Drawing. Application December 21, 1955
Serial No. 554,392

Claims priority, application Great Britain
January 11, 1955

2 Claims. (Cl. 23—78)

This invention relates to the production of calcium cyanamide.

The various known continuous and batch processes for the production of calcium cyanamide from calcium carbide are based upon the nitrogenation of the latter in accordance with the reaction:

$$CaC_2 + N_2 \rightarrow CaCN_2 + C$$

and they differ from one another only in the readiness with which this reaction proceeds.

It is known that this reaction is rather slow and only starts at an elevated temperature, but that once it has been initiated such a considerable heat of reaction is evolved that the temperature of the reaction medium may exceed the range of thermal stability of the cyanamide formed. Efforts made to improve the performance of the reaction have been directed primarily at reducing its duration and at lowering the temperature at which it is carried out. Thus, the addition of certain substances to the calcium carbide, such as calcium chloride or calcium fluoride, has long been accepted practice and allows the temperature at which the reaction starts to be lowered and the progress thereof to be regulated. With the same object in view, it has also been proposed to mix prepared cyanamide with the carbide to be nitrogenated. This addition scarcely affects the starting temperature, but may serve as a diluent to prevent excessive violence of the reaction without introducing any foreign substance into the final product.

Various proposals have been made to shorten the duration of the reaction by subjecting the carbide to the action of nitrogen under a higher pressure than is customarily used, sometimes in the presence of substances which lower the reaction temperature or of inert substances such as silica. However, it has been found that there is a danger of such a reaction becoming excessively violent and uncontrollable, so that the product contains material which has been exposed to excessively high temperatures together with material which has been incompletely nitrogenated. The operation is therefore inadequate, the cyanamide obtained is of low quality and, in some cases is "denatured" by the inert substances (the behavior of which with respect to the components of the reaction mixture at the high temperatures employed is unknown and the presence of which reduces the production capacity of the unit). For these reasons, nitrogenation under higher pressure has found no commercial application and in practice the cyanamide has always been produced at a normal or slightly elevated nitrogen pressure, corresponding for example to the pressure of 50 to 200 millimetres of water, and in any case lower than 1.5–2 kg./cm.$^2$.

The processes heretofore employed commercially for the manufacture of calcium cyanamide have in common the fact that they do not result in a complete conversion of the calcium carbide into cyanamide. In fact, it is known that appreciable quantities of the carbide employed, of the order of 19% or even 20%, are neither converted into cyanamide in the course of the reaction nor recovered in the form of residual carbide after the reaction. In other words, a substantial part of the calcium carbide undergoes an unknown conversion which prevents ordinary nitrogenation thereof and consequently results in a reduction in the nitrogenation yield and an equivalent loss of calcium cyanamide. At the same time, it is generally found that about 5% of the nitrogen fixed is present in the cyanamide in a water-insoluble form and is therefore ineffective in the use of the product both in agriculture and in industry.

These disadvantages are obviated by the process of the present invention, in which a product obtained by nitrogenation of calcium carbide using nitrogen under a pressure less than 2 kg./cm.$^2$ is further reacted at a temperature between 700° C. and 1300° C. with nitrogen under a pressure between 2 and 100 kg./cm.$^2$, and preferably between 20 and 100 kg./cm.$^2$. The product submitted to nitrogenation under pressure is calcium cyanamide such as obtained by one of the customary carbide nitrogenation processes using nitrogen under a pressure lower than 2 kg./cm.$^2$.

In accordance with a feature of the invention the product which is further reacted with nitrogen is obtained by an operation in which calcium carbide is nitrogenated by a normal process using nitrogen under a pressure lower than 2 kg./cm.$^2$, which operation is stopped before the end of the conversion of the carbide into cyanamide. In accordance with a further feature of the invention the product which is further reacted with nitrogen contains a mixture of calcium carbide and calcium cyanamide (the latter having been produced by a known low pressure nitrogenation process) preferably in the proportion of 1 to 9 parts by weight of cyanamide to 1 part of carbide.

In carrying out the invention, it is convenient to employ as starting material, a product resulting from the partial or substantially complete nitrogenation of calcium carbide by means of nitrogen at low pressure (lower than 2 kg./cm.$^2$) while that product is still at elevated temperature such as, for example, between 700° C. and 1300° C.

If, on the other hand, the cyanamide obtained by more or less complete nitrogenation using nitrogen under a pressure lower than 2 kg./cm.$^2$ is allowed to cool, or if it is desired to subject a mixture of this cyanamide and, of calcium carbide to nitrogenation under pressure, the material is placed in a nitrogenation autoclave provided with a normal starting device (heating element) in which it is nitrogenated under a pressure between 2 and 100 kg./cm.$^2$, preferably under a pressure between 20 and 100 kg./cm$^2$, when it has reached a temperature between 700° C. and 1300° C. under the action of the starting device.

The process is based upon the observation that compounds formed in low pressure nitrogenation of calcium carbide and which react neither as carbide nor as cyanamide can be nitrogenated under a higher pressure and are thereby converted into cyanamide of normal composition, and that at the same time the nitrogenated compounds of cyanamide which are not soluble in water disappear almost completely. It it thus possible to obtain a substantially completely nitrogenated cyanamide thereby increasing the nitrogenation yield and utilising substantially all the carbide initially employed. It also allows the use of carbide of lower quality or one obtained from less pure starting materials, while maintaining a high nitrogenation yield and a normal nitrogen content in the commercial product.

It has been found that the duration of the reaction according to the invention, when carried out under suitable conditions, for example under a pressure of about 50 kg./cm.² at a temperature of 1100° C.–1200° C., is relatively short and is generally less than one-tenth of the duration of the usual nitrogenation under normal pressure in which the end of the nitrogenation is asymptotically approaching the final nitrogen content. Since it is possible to shorten the latter duration by several tenths, the total duration of the operations of nitrogenation at normal pressure and at high pressure is less than that of the current nitrogenation carried out entirely using nitrogen under a pressure lower than 2 kg./cm.².

The process of the present invention can readily be adapted to existing continuous or batch units, and it is sufficient for a tenth, or even less, of the existing nitrogenation units to be able to work under a pressure between 2 and 100, and preferably between 20 and 100 kg./cm.². Of course, plants may also be employed in which all the nitrogenation units are adapted to work under either normal or under higher pressure as desired. The following examples illustrate a number of possible applications of the process of the present invention, which were carried out using technical carbide containing 70% $CaC_2$.

In these examples, the total yield $R_g$ of the nitrogenation is calculated on the ratio:

(1)
$$R_g = \frac{\text{total amount of fixed nitrogen } (a)}{\text{amount of nitrogen theoretically fixable } (A)}$$

said amounts corresponding to 100 kg. of technical carbide containing 70% $CaC_2$.

The quantity $a$ may be determined by analysis of the product of nitrogenation.

As regards the quantity $A$, it represents the theoretical amount of nitrogen fixable in the form of $CaCN_2$. As results from the reaction:

$$CaC_2 + N_2 \rightarrow CaCN_2 + C$$

64.09 kg. pure $CaC_2$ theoretically fix 28.02 kg. nitrogen.
Therefore:
100 kg. pure $CaC_2$ will fix $$\frac{28.02 \times 100}{64.09} = 43.7 \text{ kg. nitrogen}$$

and 100 kg. of technical carbide, such as used in the examples and containing 70% $CaC_2$, theoretically fix: 43.7 × 0.70 = 30.6 kg. nitrogen, which figure represents the quantity $A$ cited above.

It results from Formula 1 above that:

$$R_g = \frac{a}{A} \text{ or, in percentage}$$

$$R_g \text{ percent} = \frac{100a}{A} = \frac{100a}{30.6} = 3.268a\% \qquad (2)$$

On the other hand, the actual nitrogenation yield, $$R_c = \frac{\text{fixed nitrogen in cyanamid form } (A')}{\text{theoretically fixable nitrogen } (A)}$$

The quantity $A$ has already been determined above.

As regards $A'$, the total amount $a$ of nitrogen fixed to 100 kg. of technical carbide, gives a percentage $b$ of nitrogen in the product:

$$b\% = \frac{100a}{100+a} \qquad (3)$$

From this percentage, a portion $c\%$ exists in the product in the form of unknown compounds which are insoluble in water, the remaining portion $(b-c)\%$ being constituted by water-soluble pure cyanamide, $CaCN_2$.
Therefore:

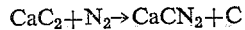

$$A' = a \cdot \frac{b-c}{b}$$

and $$R_c \text{ (in percent)} = \frac{100A'}{A}$$

$$\frac{100a \cdot \frac{b-c}{b}}{30.6} = 3.286 a \cdot \frac{b-c}{b}$$

Replacing $b$ by $$\frac{100a}{100+a}$$

(Formula 3 above), there is obtained $$R_c = 3.286 \, (100+a)(b-c) \qquad (4)$$

In this formula:

$$b = \frac{100a}{100+a}$$

$a$ is determined by analysis, as already noted above and $c$ may also be determined by quantitative analysis of nitrogen existing in the form of water-insoluble compounds in the final product.

*Example I*

Cyanamide produced in the usual manner by means of nitrogen under a pressure of 125 mm. of water with fixation of 28.3 kg. of nitrogen on 100 kg. of carbide, which gave on analysis:

$b = 22.06\%$ of total nitrogen
$c = 1.10\%$ of water-insoluble nitrogen corresponding to a total yield $R_g = 92.5\%$ and to an actual yield in cyanamide nitrogen of $R_c = 87.9\%$, was introduced into an autoclave while still at a temperature of about 1100° C., and was reacted for 2 hours with nitrogen under a pressure of 50 kg./cm.².

Analysis carried out after cooling and crushing showed that the quantity of nitrogen fixed amounted to $a = 30.1$ kg. and that the water-insoluble nitrogen content was only $c = 0.24\%$. Thus:

$b = 23.14\%$
$R_g = 98.4\%$
$R_c = 97.4\%$

The short treatment according to the invention thus increased the total yield from 92.5% to 98.4% and the actual nitrogenation yield (expressed in water-soluble cyanamide nitrogen) from 87.9% to 97.4%. Taking account of the fact that about 2% of the carbide employed is lost by chemical decomposition during the grinding of the carbide and by manipulation during the operations, it will be seen that the cyanamide treated by the process according to the invention is substantially completely nitrogenated and that the intermediate compounds were converted into water-soluble cyanamide.

*Example II*

Cyanamide obtained at ordinary pressure by the same operation as was employed in Example I was mixed with carbide in the proportion of 4 parts of cyanamide to 1 part of carbide. This mixture was introduced into an autoclave provided with a starting device consisting of an electrically heated graphite resistor, and was reacted with nitrogen under a pressure of 55 kg./cm.². The product contained, to 100 kg. of carbide, $a = 29.95$ kg. of fixed nitrogen, the water-insoluble nitrogen content of which reached $c = 0.21\%$, from which there were determined:

$b = 23.05\%$
$R_g = 97.9\%$
$R_c = 97.0\%$

The result of the experiment is substantially the same as that of Example I.

*Example III*

Nitrogenation of carbide at ordinary pressure was stopped when 100 kg. of carbide had fixed 18.5 kg. of nitrogen, i.e. about two thirds of the normal quantity. This product was immediately introduced, without undergoing any considerable cooling, into an autoclave in which the nitrogenation was completed under a pressure of 50 kg./cm.$^2$ in about six hours. It was found that the nitrogen fixation was $a=30.0$ kg. and that the water-insoluble nitrogen content was $c=0.3\%$. Thus:

$$b=23.08\%$$
$$R_g=98.0\%$$
$$R_c=96.8\%$$

This example also shows an actual nitrogenation yield, expressed as water-soluble cyanamide, approaching the theoretical of about 98%. This result is all the more remarkable since the duration of all the operations at ordinary pressure and at high pressure was substantially shorter than that which would be necessary for the complete operation at ordinary pressure alone, i.e. if it had been continued in the usual manner until the fixation of 27 to 28.5 kg. of nitrogen giving an actual cyanamide nitrogen yield of about 88%.

I claim:

1. A process for the production of calcium cyanamide comprising the steps of partially reacting nitrogen with calcium carbide at a pressure of less than two kilograms per square centimeter to form a partially nitrogenated product which comprises one to nine parts of calcium cyanamide to one part of calcium carbide and reacting the partially nitrogenated product with nitrogen at a higher pressure of from twenty to one hundred kilograms per square centimeter to complete the formation of said calcium cyanamide.

2. A process as claimed in claim 1, wherein the partially nitrogenated product tends to cool between reacting steps, comprising reacting the partially nitrogenated product before it cools below 700° centigrade.

References Cited in the file of this patent

UNITED STATES PATENTS

| | | |
|---|---|---|
| 1,297,246 | Reid | Mar. 11, 1919 |
| 1,922,230 | Caro et al. | Aug. 15, 1933 |